(12) United States Patent
Ward

(10) Patent No.: US 6,982,067 B2
(45) Date of Patent: Jan. 3, 2006

(54) CATALYTIC REACTOR

(75) Inventor: Andrew M Ward, Stockton on Tees (GB)

(73) Assignee: Johnson Matthey PLC, (GB)

( * ) Notice: Subject to any disclaimer, the term of this patent is extended or adjusted under 35 U.S.C. 154(b) by 574 days.

(21) Appl. No.: 10/106,055

(22) Filed: Mar. 27, 2002

(65) Prior Publication Data
US 2002/0102192 A1 Aug. 1, 2002

Related U.S. Application Data

(63) Continuation of application No. PCT/GB00/03425, filed on Sep. 7, 2000.

(30) Foreign Application Priority Data
Sep. 29, 1999 (GB) .................................. 9922940

(51) Int. Cl.
*B01J 8/04* (2006.01)
(52) U.S. Cl. ..................... 422/216; 422/218; 422/220
(58) Field of Classification Search ................ 422/181, 422/211, 218, 216, 220
See application file for complete search history.

(56) References Cited

U.S. PATENT DOCUMENTS

| 3,090,667 | A | | 5/1963 | Connellan | |
|---|---|---|---|---|---|
| 4,033,727 | A | | 7/1977 | Vautrin | |
| 4,110,081 | A | * | 8/1978 | Millar et al. | ................. 422/213 |
| 5,202,097 | A | * | 4/1993 | Poussin | ...................... 422/218 |

FOREIGN PATENT DOCUMENTS

| EP | 0911075 | 4/1999 |
|---|---|---|
| JP | 61171530 | 8/1986 |
| WO | 9920384 | 4/1999 |

* cited by examiner

*Primary Examiner*—N. Bhat
(74) *Attorney, Agent, or Firm*—Mayer Brown Rowe & Maw

(57) ABSTRACT

An axial/radial—or radial/flow catalytic reactor has inlet and outlet ports and a bed of particulate catalyst disposed as e.g. a cylinder or cone round a central region communicating with one of the ports. For at least part of the height of the catalyst bed, the exterior surface of the catalyst bed has a diameter less than that of the reactor thus leaving space between the exterior surface of the catalyst bed and the interior walls of the reactor. This space is filled with a particulate material presenting less resistance to flow than the catalyst particles.

11 Claims, 2 Drawing Sheets

CATALYTIC REACTOR

This is a Continuation of International Application No. PCT/GB00/03425 filed Sep. 7, 2000 which designated the U.S. and was published in the English language. The entire contents of the PCT application are hereby incorporated in their entirety by reference.

This invention relates to a catalytic reactor.

Many catalytic reactions are effected using a fixed bed of a particulate catalyst disposed in a reactor, generally of circular cross section. The process fluid passes from an inlet port through the fixed bed and exits the reactor through an outlet port. Often the bed is configured so that the process gas flows in a direction generally parallel to the axis of the reactor. In this arrangement, termed axial flow, the process fluid normally flows down through the bed in order to minimise movement of the catalyst particles. This arrangement has advantages of simplicity, ease of catalyst loading and discharge, and minimal additional components within the reactor. Thus unless heat exchange means are required in the bed, generally it is necessary only to provide a fluid-permeable catalyst restraint, e.g. a suitably sized grid or mesh, to prevent the catalyst particles entrained in the process fluid from discharging through the process fluid outlet.

In order to cause the fluid to flow through the bed, a pressure differential is established between the inlet and outlet. The pressure differential required depends, inter alia, on the thickness of the bed, the resistance to flow that the bed material presents and the fluid flow rate. It is often desirable to minimise this pressure differential and/or to increase the fluid flow rate without significantly increasing the required pressure differential.

To this end, an alternative configuration, radial flow, is sometimes adopted. Thus the particulate catalyst is disposed in an annulus defined by fluid-permeable catalyst restraining members, e.g. baskets, within the reactor disposed so that the process fluid flows radially from an inlet region round the periphery of the reactor cross section, through the catalyst bed, and into a centrally disposed outlet region. Alternatively the flow may be in the reverse direction, i.e. from a central inlet region, radially outwards through the catalyst bed, to an outlet or collection zone disposed around the periphery of the reactor. In other designs, a combination of axial and radial flow may be employed. While such radial flow arrangements may offer advantages in the pressure differential required to effect a flow of the process fluid at a desired rate, they require more complicated reactor internals and charging and/or discharge of the particulate catalyst is less facile.

We have devised an arrangement wherein radial, or axial-radial, flow may be achieved with the consequent advantages of reduced pressure differential but without complex reactor internals.

Accordingly the present invention provides a catalytic reactor having inlet and outlet ports and a bed of particulate catalyst disposed round a central region communicating with one of the ports and presenting less resistance to flow than the catalyst particles, said central region within the bed having a height equal to at least a major part of the height of the catalyst bed, and, for at least a major part of the height of the catalyst bed, the exterior surface of the catalyst bed has a cross section less than that of the reactor thus leaving a space between the exterior surface of the catalyst bed and the interior walls of the reactor, and this space is filled with a particulate material presenting less resistance to flow than the catalyst particles.

The catalyst bed preferably has an exterior surface approximating to the shape of a single cylinder or conical frustum, or stack of two or more cylinders or conical frusta of differing maximum diameters, or a stack of one or more cylinders and one or more conical frusta. Part of the catalyst bed may have an exterior diameter equal to that of the interior diameter of the reactor, i.e. so that for this part there is no space between the interior wall of the reactor and the exterior surface of the catalyst bed. However the minimum diameter of the exterior surface of the catalyst bed is less than the interior diameter of the reactor so that for at least the major part of the height of the bed, there is a space between the interior walls of the reactor and the exterior surface of the catalyst bed. This space is filled with a particulate material presenting less resistance to flow of the process fluid than said catalyst particles.

Likewise the central region within the catalyst bed preferably has a form approximating to a cone, conical frustum or cylinder; or to a stack of a cone and one or more conical frusta or cylinders; or to a stack of two or more cylinders or conical frusta of differing maximum diameters, or to a stack of one or more cylinders and one or more conical frusta. Preferably it has the form approximating to a single cylinder or conical frustum, and a surface area greater than that of the cross section of the reactor. The height of the central region within the catalyst bed is a major proportion, preferably at least 70%, of the height of the catalyst bed.

BRIEF DESCRIPTION OF THE DRAWINGS

The invention is illustrated by reference to the accompanying drawings in which:

In FIG. 1 there is shown a reactor 1 of cylindrical cross section with an inlet port 2 at the upper end of the reactor and an outlet port 3 at the lower end. A perforate catalyst restraining means 4, for example a cylindrical wire mesh cage, is disposed above the outlet port 3 to define a free space 5, forming the requisite central region within the catalyst bed, in communication with the outlet port 3. Surrounding the catalyst restraining means 4 is a particulate catalyst bed 6 for example in the form of cylindrical pellets. The catalyst pellets typically have maximum and minimum dimensions in the range 1 to 10 mm and an aspect ratio (maximum dimension/minimum dimension) in the range 1 to 5. The size of the openings in the catalyst restraining means should be such that the catalyst particles cannot pass therethrough. The space between the interior walls 7 of the reactor 1 and the exterior surface of the catalyst bed forms a region 8 filled with a particulate material that presents less resistance to flow than the particles of the catalyst bed 6. Typically the particulate material filling region 8 is of greater particle size than the catalyst particles. Preferably these particles have a minimum dimension at least 1.5 times the minimum dimension of the catalyst particles and, preferably, a maximum dimension no more than 2.5 times the maximum dimension of the catalyst particles. These larger particles may be of cylindrical configuration and may also have one or more axially extending through holes to lower the resistance to flow of process fluid through the region 8. The particles of region 8 may also extend across the top 9 of the catalyst bed.

Figure 1:
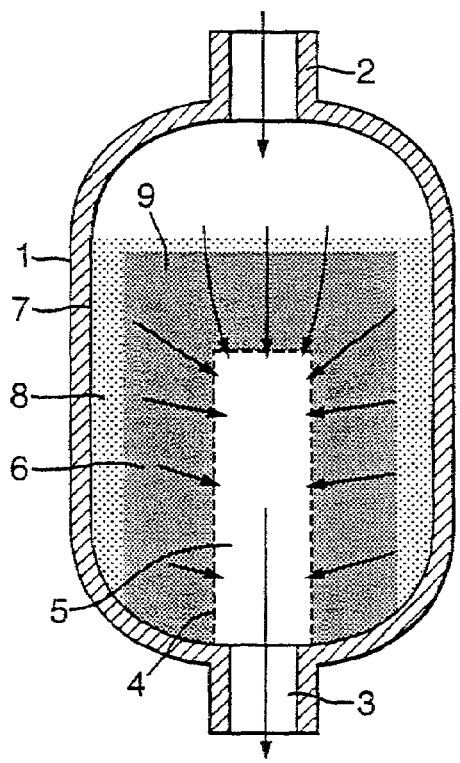
FIG. 1 is a diagrammatic section through a reactor in accordance with the invention configured for axial/radial flow.

In use the process fluid is fed to inlet port 2 and flows axially down through the region 8 and then through the catalyst bed 6 into the free space 5 and thence to the outlet port 3. Since region 8 presents less resistance to flow than the catalyst bed 6, the process fluid flows down through region 8 and then generally radially through the catalyst bed 6 to the free space 5. Also the process fluid flows axially down through the part of the catalyst bed 6 above the top of the catalyst restraining means 4. If the top of the catalyst restraining means 4 is made solid, then the layer of catalyst bed above the top of catalyst restraining means 4 may be omitted so that the flow of process fluid through the catalyst bed 6 is essentially radial. Alternatively, whether or not the top of the catalyst restraining means 4 is solid, a disc or plate may be positioned upon the top of the catalyst bed to modify the flow pattern through the upper part of the catalyst bed.

Figure 2:
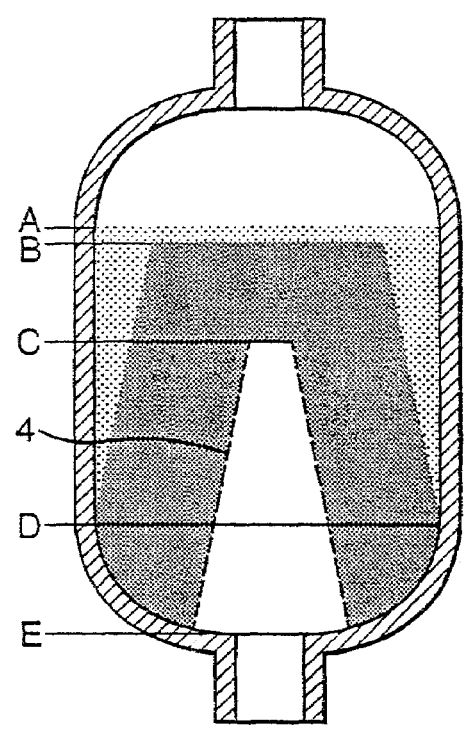
FIG. 2 is a view similar to FIG. 1 showing an alternative embodiment.

In the embodiment of FIG. 2, the catalyst restraining means 4 is made in the form of a frustum of a cone and the catalyst bed 6 is likewise of generally frusto-conical configuration. This arrangement is preferred so that there is more even flow distribution of the process fluid through the catalyst bed 6. It is preferred that the catalyst restraining means 4 is configured such that the resistance to flow of the process fluid through the catalyst bed is substantially uniform.

Figure 3:
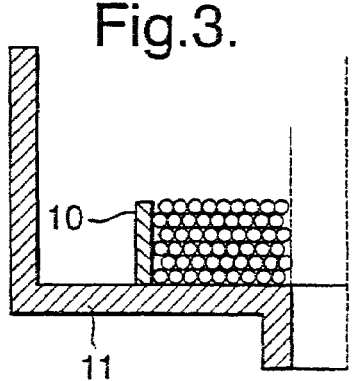
FIGS. 3 to 5 are diagrammatic part sections of part of the reactor of FIG. 1 illustrating the sequence of charging the particulate materials to the reactor.
Figure 4:
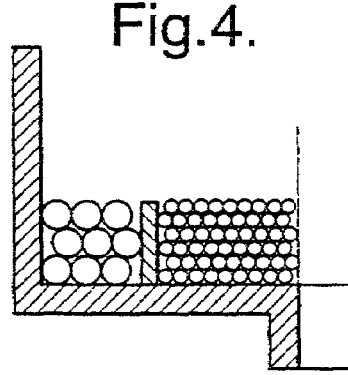
Figure 5:
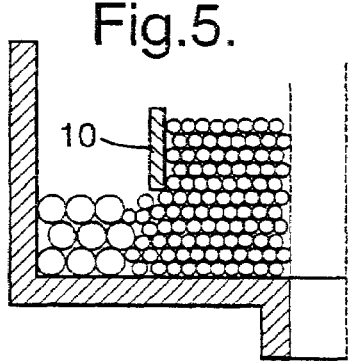

In FIGS. 3 to 5, one method of charging the particulate materials to the reactor is illustrated. Thus as shown in FIG. 3, a ring 10 is positioned on the lower wall 11 of the reactor at the location where it is desired that the junction between bed 6 and region 8 should occur and then the catalyst particles are charged to the annular region enclosed by the catalyst restraining means 4 and the ring 10. As shown in FIG. 4 the annular region between the ring 10 and the wall 7 of the reactor is then filled with the particles required for region 8. As shown in FIG. 5, the ring 10 is then lifted up and repositioned on top of the previously charged particles and the procedure repeated. It will be appreciated that when ring 10 is lifted out from between the particles of bed 6 and region 8, there will be some settling of the particles to fill the space occupied by the ring. The procedure is repeated until the reactor is filled to the desired level.

The catalyst is usually charged through a manhole (not shown) in the upper wall of the reactor. In order that the ring 10 can be inserted into the reactor, it is preferably made in sections that can be introduced through the manhole and assembled inside the reactor, and/or made from a flexible material, e.g. a strip of a suitable material, e.g. a plastics material, whose ends are fastened together to form the annular ring. Where a frusto-conical configuration, for example as shown in FIG. 2, is desired, by using a ring formed by fastening the ends of a strip of flexible material, the outer diameter of successive layers forming the catalyst region 6 can be decreased by altering the position of fastening the ends of the strip. Likewise, if a conventional axial-flow reactor is being converted by means of the present invention, it is desirable that the catalyst-restraining means 4 is also as of such size, and/or constructed in sections, that it can be introduced into the reactor through the manhole.

It will also be appreciated that in an alternative embodiment, the catalyst-restraining means 4, e.g. wire mesh cage, 4 can be omitted and the central free space 5 can be filled with a particulate low flow resistance material such as that used for region B. In this case a restraining grid across the outlet port 3 will be required. The particles filling the central region can be charged in a manner analogous to that described above for the material for bed 6 and region 8.

In an alternative method of charging the reactor, a flexible mesh defining the desired boundary between bed 6 and region 8 is introduced through the manhole and the bed 6 and region 8 are charged with the respective materials without removing the mesh. In this case, the mesh should be of a suitable material that can withstand the conditions prevailing during the subsequent use of the reactor or of a material that degrades during such use to give decomposition products that do not interfere with the catalyst or the process fluid. In many cases a mesh made of a plastics material such as polypropylene can be used.

Accordingly the present invention also provides a method of charging a reactor having inlet and outlet ports with a bed of a particulate catalyst comprising providing a first, perforate, catalyst restraining means to define central region within the desired catalyst bed and connected to one of said ports, disposing a second particle restraining means between said first catalyst restraining means and the interior wall of said reactor, filling the space between said first and second restraining means with particulate catalyst and filling the space between the second restraining means and the interior wall of the reactor with a particulate material that presents less resistance to flow than said catalyst particles.

The particles from the bed 6 and region 8 can be discharged from the reactor in known manner, e.g. by providing a discharge port in the lower wall of the reactor and/or by vacuum extraction through a hose inserted through the manhole or other port employed for charging. If the particles used for bed 6 and region 8 are of sufficiently different size, if desired the discharged catalyst can be sieved to separate the larger particles of region 8 from the catalyst particles.

Figure 6:
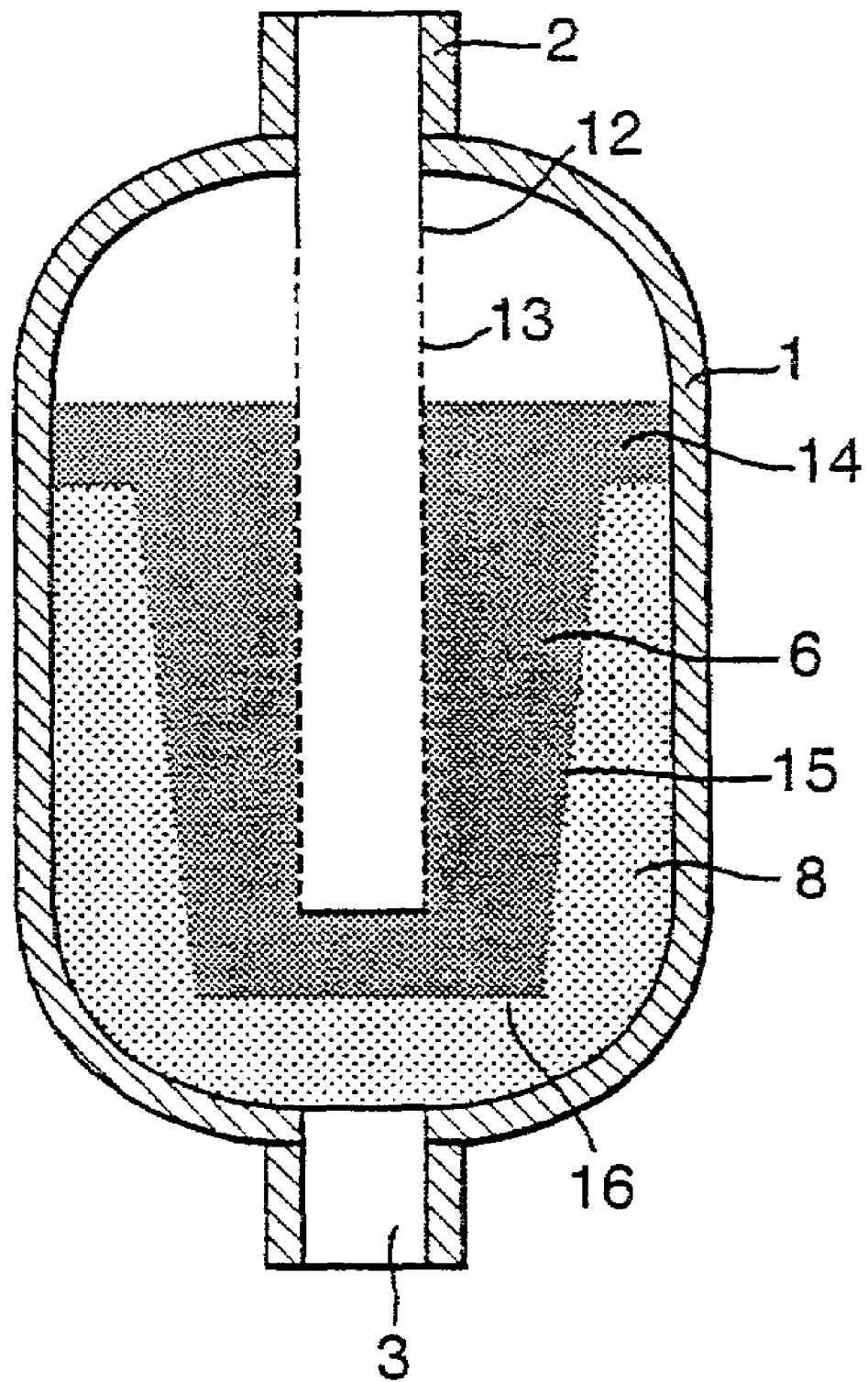
FIG. 6 is a view similar to FIG. 1 showing yet a further embodiment.

In the embodiment shown in FIG. 6, a central pipe 12 is connected to the inlet port 2 and the lower portion 13 of this pipe is perforate and extends into the catalyst bed 6 and so defines the central region within the catalyst bed 6. in this embodiment, the catalyst bed has an exterior surface in the form of a cylinder 14 on top of a conical frustum 15 that has its minimum diameter at its lower end (i.e. unlike the embodiment of FIG. 2 where the minimum diameter is at the upper end). The cylindrical portion 14 has, in this embodiment, a diameter the same as the internal diameter of the reactor, but has a depth that is only a minor proportion of the depth of the catalyst bed 6. The space 8 between the conical frustum portion 15 of the external surface of the catalyst bed 6 and the interior walls 7 of the reactor, and between the lower end 16 of the catalyst bed 6 and the outlet port 3, is filled with a particulate material presenting less resistance to flow than the catalyst particles.

In use, the process fluid is fed through the inlet port 2 and passes down pipe 12 and flows out through the perforations therein. The process fluid thus flows radially outwards through the catalyst bed into the space 8 between the exterior surface of the frusto-conical portion of the catalyst bed and the internal wall of the reactor and thence to the outlet port 3 (which is provided with a grid, not shown, to prevent the particulate material filling space 8 from entering the outlet port 3). Since pipe 12 has some perforations above the upper surface of the catalyst bed 6, the process fluid can also flow from pipe 12 into the space above the catalyst bed 6 and axially down through the cylindrical upper portion 14 of the catalyst bed, into region 8.

The adjacent beds of particulate catalyst and the particulate material filling the space 8 between the exterior surface of the catalyst bed and the interior walls of the reactor can be formed in a manner analogous to that described above in relation to FIGS. 3 to 5, but the lower end of the reactor is filled with the particles presenting less resistance to flow in order to provide the layer of that material between the bottom 16 of the catalyst bed 6 and the outlet port 3 before the restraining means used to define the boundary between region 8 and the conical wall of the catalyst bed is introduced.

It will be appreciated that in an alternative embodiment, the particles used to fill the region 8 (and/or region 5 if that is filled with particulate material) may itself be particulate catalyst but of a size or configuration that it presents significantly less resistance to flow than the particles of the catalyst bed 6.

The invention is of particular utility for converting a reactor previously employed in axial flow mode to axial/radial, or radial, flow without involving significant internal modification of the reactor.

Accordingly we also provide a method of converting a reactor having inlet and outlet ports and a manhole from axial flow to axial/radial or radial flow comprising introducing through said manhole perforate catalyst restraining means and attaching said catalyst restraining means to one of said ports so as to define an enclosure extending from said port for part of the length of the reactor, charging to said reactor a particulate catalyst material so as build up a catalyst bed around said catalyst restraining means, with, for at least a major part of the height of said bed, a region between the exterior surface of said bed and the interior walls of the reactor, and charging to said region a particulate material that presents less resistance to flow than said catalyst particles.

The invention may be applied to any fixed bed catalytic process but is of particular utility for processes involving the adiabatic catalytic reaction of a gaseous process fluid. Examples of such reactions are adiabatic low temperature steam reforming, water gas shift, methanol synthesis, methanation, ammonia synthesis, and hydrogenation reactions.

The invention therefore further provides a process comprising passing a process fluid through an inlet port of a reactor, then through a series of regions within said reactor, and then through an outlet port of said reactor, wherein the second region is a fixed bed of a particulate catalyst disposed round a central region forming one of the first and third regions and is connected to one of said ports and presents less resistance to flow of said process fluid than said catalyst bed and which central region has a height equal to a major proportion of the height of the bed and, for at least a major part of the height of the catalyst bed, the exterior surface of the catalyst bed has a cross section less than that of the reactor thus leaving a space between the exterior surface of the catalyst bed and the interior walls of the reactor, and this space is filled with a particulate material presenting less resistance to flow than the catalyst particles and forms the other of said first and third regions.

As an example, a reactor of the invention of the type shown in FIG. 2 is compared with a conventional axial flow reactor for the high temperature shift reaction using a particulate iron oxide/chromia catalyst.

The conventional axial flow reactor has an interior diameter of 3.7 m and the dished lower end, corresponding to the region DE in FIG. 2, has a height, distance DE, of 0.93 m. A catalyst restraining grid is disposed across the outlet port and the dished lower end is filled with inert alumina balls presenting little resistance to flow of process gas. The cylindrical portion, i.e. corresponding to region AD, of the reactor is charged with 40 m$^3$ of cylindrical catalyst pellets of diameter 8.5 mm and length 4.9 mm. The height of the catalyst bed, i.e. distance AD, is 3.7 m. A layer of alumina balls is charged on top of the catalyst bed to a depth of 150 mm.

In use a typical gas mixture containing 56.5 mol % hydrogen, 12.9 mol % carbon monoxide, 7.5 mol % carbon dioxide, 0.3 mol % methane and 22.8 mol % nitrogen is passed at a rate of 150,000 Nm$^3$/h together with 75,000 Nm$^3$/h of steam through the catalyst bed at an elevated pressure. The pressure drop across the catalyst bed is about 0.25 bar.

According to the invention, the above axial flow configuration is modified using the arrangement shown in FIG. 2. The frusto-conical mesh 4 has its sides inclined to the horizontal at an angle of 80°. The height of the frustum above line D, i.e. distance CD, is 2.8 m, and the diameter of the frustum at line D is 1.5 m and at line C is 0.52 m. The catalyst is charged to the reactor so that it fills the space in the lower dished end (instead of using alumina balls) and then as a frustum up to line B. The frustum again has its sides inclined at 80° to the horizontal. Distance BD is 3.7 m. At line D, the outer diameter of the catalyst bed is 3.7 m, i.e. the full internal diameter of the reactor. The space outside the catalyst bed is filled with alumina rings of 17 mm diameter and 17 mm height having a central hole of 10 mm diameter. A layer of these rings is also disposed above the top of the catalyst to a depth, i.e. distance AB, of 150 mm. The total volume of catalyst is 33 m$^3$. To compensate for the decrease in volume of catalyst compared to the 40 m$^3$ employed in the axial flow configuration, a smaller catalyst particle size is used. Thus the catalyst particles are cylindrical pellets of 5.4 mm diameter and 3.6 mm length. Because of the higher geometric surface area of the catalyst pellets per unit volume, the smaller pellets have a greater activity per unit volume. 33 m$^3$ of the smaller pellets has about the same catalytic performance as 40 m$^3$ of the larger pellets employed in the conventional axial flow configuration.

Calculation shows that the pressure drop for the configuration of the invention when employed under the same conditions as the conventional axial flow configuration is 0.13 bar.

I claim:

1. A catalytic reactor having inlet and outlet ports and a bed of particulate catalyst disposed round a central region communicating with one of the ports and presenting less resistance to flow than the catalyst particles, said central region within the bed having a height equal to at least a major part of the height of the catalyst bed, and, for at least a major part of the height of the catalyst bed, the minimum diameter of the exterior surface of the catalyst bed is less than the interior diameter of the reactor, thus leaving a space between the exterior surface of the catalyst bed and the interior walls of the reactor, wherein said space is filled with a particulate material presenting less resistance to flow than the catalyst particles.

2. A catalytic reactor according to claim 1 wherein the central region within the catalyst bed has a form approximating to a single cylinder or conical frustum.

3. A catalytic reactor according to claim 1 wherein the exterior surface of the catalyst bed has a form approximating to a single cylinder or conical frustum.

4. A catalytic reactor according to claim 1 wherein the exterior surface of the catalyst bed has a form approximating to a cylinder having a diameter equal to the interior diameter of the reactor stacked on top of a conical frustum.

5. A catalytic reactor according to claim 1 wherein the central region within the catalyst bed has a surface area greater than that of the cross section of the reactor.

6. A catalytic reactor according to claim 1 wherein the height of the central region within the catalyst bed is at least 70% of the height of the catalyst bed.

7. A catalytic reactor according to claim 1 wherein the catalyst is in the form of cylindrical pellets having maximum and minimum dimensions in the range 1 to 10 mm and an aspect ratio in the range 1 to 5.

8. A catalytic reactor according to claim 1 wherein the particles of the material presenting less resistance to flow of the process fluid than said catalyst particles have a minimum dimension that is at least 1.5 times the minimum dimension of the catalyst particles.

9. A catalytic reactor according to claim 1 wherein the particles of material presenting less resistance to flow of the process fluid than said catalyst particles are of cylindrical configuration.

10. A catalytic reactor according to claim 9 wherein the particles of material presenting less resistance to flow of the process fluid than said catalyst particles have one or more axially extending through holes.

11. A catalytic reactor according to claim 1 having perforate catalyst restraining means in the form of a cylindrical or frusto-conical mesh to define the central region within the catalyst bed.

* * * * *